US012148602B2

(12) United States Patent

Richardson et al.

(10) Patent No.: US 12,148,602 B2
(45) Date of Patent: Nov. 19, 2024

(54) ADAPTIVE INTRINSIC LOCK MASS CORRECTION

(71) Applicant: Micromass UK Limited, Wilmslow (GB)

(72) Inventors: Keith George Richardson, High Peak (GB); Martin Raymond Green, Bowdon (GB); John Brian Hoyes, Stockport (GB); Richard Denny, Staffordshire (GB); Peter Nixon, Cheshire (GB); Richard Chapman, Westborough, MA (US)

(73) Assignee: Micromass UK Limited, Wilmslow (GB)

(*) Notice: Subject to any disclaimer, the term of this patent is extended or adjusted under 35 U.S.C. 154(b) by 242 days.

(21) Appl. No.: 17/638,640

(22) PCT Filed: Aug. 28, 2020

(86) PCT No.: PCT/GB2020/052069
§ 371 (c)(1),
(2) Date: Feb. 25, 2022

(87) PCT Pub. No.: WO2021/038242
PCT Pub. Date: Mar. 4, 2021

(65) Prior Publication Data

US 2022/0301838 A1 Sep. 22, 2022

Related U.S. Application Data

(60) Provisional application No. 62/894,298, filed on Aug. 30, 2019.

(30) Foreign Application Priority Data

Aug. 30, 2019 (GB) ..................................... 1912494

(51) Int. Cl.
*H01J 49/00* (2006.01)

(52) U.S. Cl.
CPC ...... *H01J 49/0009* (2013.01); *H01J 49/0036* (2013.01)

(58) Field of Classification Search
CPC .......................... H01J 49/0009; H01J 49/0036
See application file for complete search history.

(56) References Cited

U.S. PATENT DOCUMENTS

| | | | |
|---|---|---|---|
| 9,418,824 | B2 | 8/2016 | Wildgoose |
| 2005/0023454 | A1 | 2/2005 | Bateman et al. |

(Continued)

FOREIGN PATENT DOCUMENTS

| | | | |
|---|---|---|---|
| CN | 102901529 | A | 1/2013 |
| CN | 104160472 | A | 11/2014 |

(Continued)

OTHER PUBLICATIONS

ISR & WO issued in PCT Application No. PCT/GB2020/052069, mailed on Nov. 9, 2020, 14 pp.

(Continued)

*Primary Examiner* — David P Porta
*Assistant Examiner* — Meenakshi S Sahu
(74) *Attorney, Agent, or Firm* — Goodwin Procter LLP

(57) ABSTRACT

A method of correcting mass spectral data comprises making calibration measurements of first intrinsic components (A, B, C) at one or more calibration times (t1) using calibrants which have known mass to charge ratio (m/z) values or previously mass measured mass to charge ratio (m/z) values, making a list of second intrinsic components (D, E, F) which are present during more than one acquisition periods, wherein the second intrinsic components have mass to charge ratio (m/z) values that were not present or observed during or close to the one or more calibration times (t1) but (Continued)

which do overlap in time with the first intrinsic components (A, B, C), and utilising the list to calculate a mass or mass to charge ratio (m/z) correction factor for one or more acquisition periods which are not close or adjacent in time to an acquisition period containing a directly calibrated mass to charge ratio (m/z) value.

17 Claims, 2 Drawing Sheets

(56) References Cited

U.S. PATENT DOCUMENTS

| | | | | |
|---|---|---|---|---|
| 2008/0067346 | A1 | 3/2008 | Amster et al. | |
| 2013/0234014 | A1 | 9/2013 | Remes | |
| 2015/0090873 | A1 | 4/2015 | Brown et al. | |
| 2016/0013036 | A1 | 1/2016 | Wildgoose | |
| 2016/0203963 | A1 * | 7/2016 | Green ................. | H01J 49/0036 702/23 |
| 2017/0125222 | A1 | 5/2017 | Brown et al. | |
| 2018/0350575 | A1 | 12/2018 | Hock et al. | |
| 2022/0293403 | A1 * | 9/2022 | Denny ................ | H01J 49/0009 |

FOREIGN PATENT DOCUMENTS

| | | | |
|---|---|---|---|
| CN | 106066359 | A | 11/2016 |
| CN | 107112192 | A | 8/2017 |
| CN | 107667413 | A | 2/2018 |
| CN | 108987238 | A | 12/2018 |
| EP | 3073510 | A1 | 9/2016 |
| GB | 2513463 | A | 10/2014 |
| GB | 2581211 | A | 8/2020 |
| GB | 2583829 | A | 11/2020 |
| WO | 2014194320 | A1 | 12/2014 |
| WO | 2015181562 | A1 | 12/2015 |
| WO | 2016193721 | A1 | 12/2016 |
| WO | 2020044050 | A1 | 3/2020 |
| WO | 2021038242 | A1 | 3/2021 |

OTHER PUBLICATIONS

Search and Exam Report issued in GB2013542.2, issued on Feb. 26, 2021, 8 pp.

Wolski et al.. "Calibration of Mass Spectrometric Peptide Mass Fingerprint Data Without Specific External or Internal Calibrants", BMC BioInformatics, Biomed Central, London GB, vol. 6, No. 1, Aug. 15, 2005, pp. 1-17.

Combined Search and Examination Report for Application No. GB1912494.0, dated Jun. 1, 2020.

Combined Search and Examination Report for Application No. GB2013535.6, dated Mar. 1, 2021.

Intemational Search Report and Written Opinion for International application No. PCT/GB2020/052071, mailed on Nov. 4, 2020.

* cited by examiner

ADAPTIVE INTRINSIC LOCK MASS CORRECTION

CROSS-REFERENCE TO RELATED APPLICATION

This application is a U.S. national phase filing claiming the benefit of and priority to International Patent Application No. PCT/GB2020/052069, filed Aug. 28, 2020, which claims priority from and the benefit of U.S. provisional patent application No. 62/894,298 filed on Aug. 30, 2019. The entire content of this application is incorporated herein by reference. This application claims priority from and the benefit of United Kingdom patent application No. 1912494.0 filed on Aug. 30, 2019. The entire content of these applications are incorporated herein by reference.

FIELD OF THE INVENTION

The present invention relates generally to a method of correcting mass spectral data, mass spectrometers and methods of mass spectrometry. Various embodiments are disclosed which relate to an improved method of lock mass correction which enables a series of calibration measurements to be made or applied during a mass spectral acquisition and wherein mass spectral data may be corrected based upon the series of calibration measurements.

BACKGROUND

It is known that the accuracy of a high resolution mass analyser or mass spectrometer is limited by its sensitivity to environmental factors such as temperature and the stability of power supplies.

The accuracy of a high resolution mass analyser or mass spectrometer may also be affected by various bulk properties of the sample being analysed. For example, space-charge effects related to a sample being analysed may affect the resolution of a high resolution mass analyser or mass spectrometer.

In order to improve the accuracy of a high resolution mass analyser or mass spectrometer it is known periodically to calibrate the mass analyser or mass spectrometer. The process of calibrating the mass analyser or mass spectrometer may comprise generating or using one or more test signals related to one or more well characterised analytes in order to monitor and correct for calibration shifts. The general loss of accuracy of a high resolution mass analyser or mass spectrometer may be characterised or approximated as relating to a first order calibration shift (although higher order calibration shifts may also be considered).

Various techniques are known to attempt to correct for such calibration shifts. The known techniques may be broadly divided into two types namely: (i) extrinsic correction methods; and (ii) intrinsic correction methods.

The calibration shift may occur over a characteristic timescale. Accordingly, the calibration corrections which should ideally be applied to acquired mass spectral data in order to correct for such calibration shifts may only be determined with sufficient accuracy at times which are sufficiently close to the times when the test signals were generated. It will be understood, therefore, that if there is a reasonable amount of time between generating test signals then the calibration of the mass analyser or mass spectrometer may start to drift between test signals. The timescale (or timescales) involved in calibration drift may be determined by studying the instrument under controlled conditions (for example in a temperature controlled environmental chamber), or simply by running known samples in a naturally variable environment.

Known extrinsic correction methods typically involve periodically running the instrument or mass spectrometer in a mode of operation wherein an external lock mass sample or calibrant is introduced into the instrument or mass spectrometer and mass spectral data corresponding to the lock mass sample or external calibrant is acquired. The mass or mass to charge ratios of analyte ions may be adjusted or corrected based upon the determined mass or mass to charge ratio of the known lock mass ions.

The lock mass sample or external calibrant may be supplied or otherwise introduced into the instrument or mass spectrometer through a separate dedicated mechanism which may be separate from a corresponding mechanism which may be used to deliver or introduce one or more analyte samples. A lock mass sample or external calibrant may be supplied or introduced into the instrument or mass spectrometer via a separate, different or dedicated ion source. For example, it is known to provide an instrument or mass spectrometer with two separate Electrospray ionisation ("ESI") ion sources. The first Electrospray ionisation ion source may be used to ionise a sample and produce analyte ions whereas the second separate Electrospray ion source may comprise a dedicated Electrospray ionisation ion source which is just used to introduce a lock mass sample or external calibrant into the instrument or mass spectrometer for mass calibration purposes.

It will be understood that the known extrinsic correction methods involve introducing a lock mass sample or external calibrant in a manner such that the analysis of the sample and hence the generation of analyte ions of interest is periodically interrupted which is generally undesirable.

Mass peaks relating to the lock mass sample or external calibrant do not appear in mass spectra which correspond with the analyte samples which is beneficial for the purity of both the lock mass data and the analyte mass spectral data. However, the requirement to repeatedly switch the instrument or mass spectrometer between two different configurations or modes of operation can be problematic. In particular, if it is necessary for multiple corrections to be made during an experiment or acquisition then it will be necessary for the experiment to be interrupted multiple times whilst separate lock mass acquisitions take place. It will be apparent that the repeated interruption of the acquisition of analyte mass spectral data can result in a loss of analyte data which is problematic.

Furthermore, the known extrinsic correction methods require the provision of an additional dedicated ion source to introduce the lock mass substance or external calibrant into the instrument or mass spectrometer. The requirement to provide a separate dedicated lock mass ion source introduces extra complexity (both mechanical and electrical) and involves additional cost.

Known intrinsic correction methods differ from extrinsic correction methods in that according to known intrinsic correction methods the species which is effectively used as a lock mass or calibrant is already present in some or all of the analyte spectra. The intrinsic lock mass substance or calibrant may be endogenous or exogenous to the analyte sample being analysed. For example, if the intrinsic lock mass is exogenous to the analyte sample then the lock mass or calibrant may have been added to the sample prior to ionisation of the sample. If the lock mass or calibrant is endogenous to the analyte sample then the lock mass or calibrant may comprise chemical background ions or another component of the sample itself.

Known intrinsic correction methods have the advantage over known extrinsic correction methods in that there is no need to interrupt the acquisition of analyte data. However, if non-native (exogenous) lock mass compounds are added to a sample prior to ionisation then there is the potential for interference to occur between analyte species and the added lock mass species which may compromise the accuracy of measuring both the analyte and lock mass species. Also, if an endogenous component (such as background ions) is used to calibrate the instrument then there may be occasions where such components are suppressed.

U.S. Pat. No. 9,418,824 (Micromass) discloses a method of mass spectrometry comprising initially calibrating or recalibrating a mass spectrometer at a time $T_0$ and at the same time measuring a time of flight or mass to charge ratio $M_0$ of one or more lock mass ions. Whilst U.S. Pat. No. 9,418,824 (Micromass) relates to an improved method of calibrating a mass spectrometer, U.S. Pat. No. 9,418,824 (Micromass) does not address some of the problems discussed above.

Accordingly, it is desired to provide an improved method of correcting mass spectral data, mass spectrometer and method of mass spectrometry and in particular it is desired to improve the accuracy of a high resolution mass analyser or mass spectrometer by providing an improved method of calibrating the instrument.

SUMMARY

According to an aspect there is provided a method of correcting mass spectral data comprising:

- making (direct) calibration measurements at one or more calibration times using calibrants which have known mass to charge ratio (m/z) values or previously mass measured mass to charge ratio (m/z) values;
- making a list of intrinsic components which are present during more than one acquisition period, wherein the components have mass to charge ratio (m/z) values that were not present or observed during or close to the one or more calibration times; and
- utilising the list to calculate a correction factor for one or more acquisition periods which are not close or adjacent in time to an acquisition period containing a directly calibrated mass to charge ratio (m/z) value.

The list may comprise a set of peak positions for each component over some or all of the acquisition periods in the experiment.

It is known to perform standard lock mass experiments wherein all data to be corrected is deemed to be sufficiently close to a calibration period. In contrast to known approaches, according to various embodiments a correction factor is calculated for one or more acquisition periods which are not close in time to an acquisition period containing a directly calibrated mass to charge ratio (m/z) value.

Lock mass experiments are also known wherein the lock mass which is used is a measured mass to charge ratio which is taken immediately after a calibration. Accordingly, any calibration error at the position of the lock mass is not imposed on all corrected data as a systematic error. The lock mass species need not have a known theoretical mass to charge ratio but it has nonetheless still been directly calibrated.

According to various embodiments, a correction is applied for one or more time periods which are not close or adjacent to a time period containing a directly calibrated value. According to various embodiments a correction may be applied in a time period which is at least two, three, four, five, six, seven, eight, nine or ten time periods remote, removed or distant from a time period in which a directly calibrated value is obtained. A single time period may be selected from the group consisting of: (i) <1 μs; (ii) 1-10 μs; (iii) 10-100 μs; (iv) 100-1000 μs; (v) 1-10 ms; (vi) 10-100 ms; (vii) 100-1000 ms; (viii) 1-10 s; (ix) 10-100 s; (x) 100-1000 s; and (xi) >1000 s.

According to another aspect there is provided a method of mass spectrometry comprising:

- mass analysing a sample;
- introducing an external or extrinsic lock mass sample or calibrant at a first time $t_1$;
- making a first external calibration measurement at or in relation to the first time $t_1$;
- recognising one or more intermediate components which are not present close to the first time $t_1$; and
- calculating or determining a correction factor based upon at least some of the one or more intermediate components According to another aspect there is provided a method of mass spectrometry comprising:

- mass analysing a sample;
- introducing an external or extrinsic lock mass sample or calibrant at a first time $t_1$;
- making a first external calibration measurement at or in relation to the first time $t_1$;
- recognising one or more intermediate components which are first present or first observed after the first time $t_1$; and
- calculating or determining a correction factor based upon at least some of the one or more intermediate components.

The method may further comprise introducing an external or extrinsic lock mass sample or calibrant at a second later time $t_2$; and

- making a second external calibration measurement at or in relation to the second time $t_2$;
- wherein the step of recognising one or more intermediate components comprises recognising one or more intermediate components which are first present or first observed after the first time $t_1$ and which are last present or last observed prior to the second later time $t_2$.

According to an aspect there is provided a method of mass spectrometry comprising:

- mass analysing a sample;
- introducing an external or extrinsic lock mass sample or calibrant at a first time $t_1$;
- making a first (external) calibration measurement at or in relation to the first time $t_1$;
- introducing an external or extrinsic lock mass sample or calibrant at a second time $t_2$;
- making a second (external) calibration measurement at or in relation to the second time $t_2$;
- recognising one or more intermediate components which are first present or first observed after the first time $t_1$ and which are last present or last observed prior to the second later time $t_2$; and
- calculating or determining a correction factor based upon at least some of the one or more intermediate components.

According to an aspect there is provided a method of mass spectrometry comprising:

- mass analysing a sample;

recognising one or more intermediate components which are first present or first observed after a first time $t_1$ and which are last present or last observed prior to a second later time $t_2$; and calculating or determining a correction factor based upon at least some of the one or more intermediate components.

Various embodiments of the present invention relate to a fully intrinsic lock mass correction method which may be used instead of, or in support of, conventional calibration methods.

According to various embodiments a method is disclosed which may be applied during one or more time periods during an experiment during which time no reliable known lock mass species or calibrant may be available or present either because of the failure (possibly temporary) of another method or because the frequency of introduction of an external lock mass species or calibrant has been deliberately reduced in order to avoid interference with the acquisition of analyte data.

The approach according to various embodiments may be utilised to improve the robustness and reproducibility of mass measurement in instruments such as mass analysers and mass spectrometers which may be susceptible to environmental variations which may result in a loss of mass accuracy with time. In particular, known methods of mass correction may fail or otherwise start becoming ineffective when too long a time has passed between successive acquisitions of reference compounds or when mass measurements of reference compounds become compromised.

One advantage of the approach according to various embodiments is that the approach allows the frequency of external lock mass events (or events in which internal lock mass compounds are added) to be reduced. Accordingly, the approach according to various embodiments allows the time between external lock mass events to be extended which reduces any interruption in the acquisition of analyte data.

The approach according to various embodiments uses or relies upon the presence of intrinsic (analyte) components within the sample being analysed. The intrinsic components may comprise parent or precursor ions of interest or fragment ions of interest and such ions may be present only for a relatively short period of time. The intrinsic components may therefore appear and disappear during an acquisition in contrast to known intrinsic methods of calibration which rely upon the detection of chemical background ions which are normally expected to be constantly observed throughout the whole course of an acquisition (but which may sometimes be suppressed at certain points during the acquisition). Of course, various embodiments may additionally/alternatively utilise measurements of persistent (or nearly persistent) intrinsic ion species. However, it is a benefit of the approaches described herein that it is not necessary to use fully persistent species.

The approach according to various embodiments avoids the requirement to accurately mass measure and construct a library of the components such as background ions which are then utilised for calibration purposes prior to the start of an analysis.

The method may further comprise:

introducing an external or extrinsic lock mass sample or calibrant at the first time $t_1$;

making a first (external) calibration measurement at or in relation to the first time $t_1$;

optionally introducing an external or extrinsic lock mass sample or calibrant at the second time $t_2$; and optionally making a second (external) calibration measurement at or in relation to the second time $t_2$.

The first time $t_1$ and the second time $t_2$ effectively determine the bounds of an extended time window during which time it is desired to mass calibrate analyte ions of interest. At least some of the intermediate components which are used to extend the mass calibration throughout the whole of the time period between the first time $t_1$ and the second time $t_2$ are only observed after the first time $t_1$ and before the second time $t_2$.

The correction factor may comprise a mass, mass to charge ratio or time correction factor.

It will be understood that with time of flight data mass, mass to charge ratio and time of flight are interrelated. Accordingly, embodiments are contemplated wherein the mass, mass to charge ratio or time of flight of mass spectral data are corrected or adjusted based upon the determined correction factor.

The correction factor may also comprise a drift time correction factor related to an ion mobility separation calibration.

The correction factor may comprise a single value or the correction factor may comprise a polynomial equation or relationship which may be used to adjust the mass, mass to charge ratio or time of flight of mass spectral data (or drift time of ion mobility separation data). More specifically, the correction factor may be a multiplicative time of flight or mass-to-charge correction, or a linear (two parameter) time of flight or mass-to-charge correction. It will be understood that the correction factor may be weighted and applied slightly differently to different analyte ions of interest dependent, for example, upon their mass to charge ratio.

The method may further comprise generating a first mass spectral data set and correcting the mass, mass to charge ratio or time of at least a portion of the first the mass spectral data set using the calculated or determined correction factor in order to generate a second mass spectral data set.

Accordingly, the first mass spectral data set may be considered as comprising unadjusted or uncorrelated mass spectral data and the second mass spectral data may be considered as comprising adjusted, corrected or correlated mass spectral data.

The one or more intermediate components may comprise intrinsic analytes within the sample or intrinsic analyte ions generated from the sample.

In contrast to conventional approaches wherein extrinsic lock mass ions may be used to calibrate a sample or wherein intrinsic background ions may be used to calibrate a sample, according to various embodiments intrinsic analyte ions of interest may be used to calibrate the sample.

At least some of the one or more intermediate components which are used to calculate or determine the correction factor may comprise first intermediate components which are present or observed during time periods which overlap with the first time $t_1$ and/or which overlap with the second time $t_2$.

First intermediate components which are present or observed during time periods which overlap with the first time $t_1$ and/or which overlap with the second time $t_2$ provide a framework for extending the mass, mass to charge ratio, time of flight or drift time calibration into the extended time period between $t_1$ and $t_2$ wherein $t_1$ and $t_2$ correspond with times when the instrument is accurately mass corrected or calibrated. Since the instrument can be accurately calibrated at times $t_1$ and $t_2$ then first intermediate components which are present or observed during time periods which overlap with the first time $t_1$ and/or which overlap with the second time $t_2$ can also be accurately mass corrected or calibrated.

The first intermediate components may be directly calibrated.

The first intermediate components which are present or observed during time periods which overlap with the first time $t_1$ and/or which overlap with the second time $t_2$ may be directly calibrated in the sense that they can be directly calibrated with reference to known lock mass ions wherein corresponding lock mass calibration events occur at times $t_1$ and $t_2$.

At least some of the one or more intermediate components which are used to calculate or determine the correction factor comprise second intermediate components which are not present or which are not observed during a time period which overlaps with the first time $t_1$ and/or which overlaps with the second time $t_2$.

Second intermediate components are not present or observed during time periods which overlap with the first time $t_1$ or with the second time $t_2$. However, second intermediate components do overlap in time with first intermediate components and wherein the first intermediate components do overlap with the first time $t_1$ or with the second time t2. Accordingly, second intermediate components can be calibrated by relying upon the calibration framework provided by the first intermediate components. Since the instrument can be accurately calibrated at times $t_1$ and $t_2$ and then by extension to times when the first intermediate components are observed, then according to various embodiments the instrument can be yet further calibrated to times when the second intermediate components are observed by linking the second intermediate components back to the first intermediate components.

The second intermediate components may be indirectly calibrated.

The second intermediate components which are not present or which are not observed during time periods which overlap with the first time $t_1$ and/or which overlap with the second time $t_2$ can be indirectly calibrated in the sense that they can be calibrated with reference to the first intermediate components and wherein the first intermediate components can be directly calibrated with respect to known lock mass ions at lock mass calibration events which may occur at times $t_1$ and $t_2$.

According to some embodiments at least some of the first intermediate components and at least some of the second intermediate components are present or observed during time periods which contiguously overlap between the first time period $t_1$ and the second time period $t_2$.

Various different embodiments are contemplated. According to various embodiments the calibration of ions between two time periods $t_1$ and $t_2$ can be achieved by calibrating ions which overlap with time periods $t_1$ and $t_2$ and then extending the calibration process by seeking to rely upon a contiguous overlap of different analyte ions being observed between time periods $t_1$ and $t_2$. However, it is not essential for there to be a contiguous overlap of different analyte ions between two time periods $t_1$ and $t_2$.

According to other embodiments, the one or more intermediate components which are used to calculate or determine the correction factor may be present or observed during non-contiguous time periods.

According to other embodiments the calibration of ions can be achieved without seeking to rely upon a contiguous overlap of different analyte ions being observed between time periods $t_1$ and $t_2$. According to this embodiment analyte ions in subsequent scans, acquisition periods or in neighboring spectral scans may be used to provide periodic calibration.

The method may further comprise changing one or more voltages applied to one or more ion optical elements in order to compensate for a calculated or determined shift in mass, mass to charge ratio or time.

Accordingly, various embodiments relate to a method of mass correction wherein parameters of an instrument, mass analyser or mass spectrometer are adjusted in real time in order to maintain mass, mass to charge ratio or time accuracy and to reduce the effects of calibration drift which might otherwise be observed.

The step of recognising one or more intermediate components may comprise recognising one or more intermediate components which are not present close or adjacent in time to the first time $t_1$ and/or the second time $t_2$. At least some of the one or more intermediate components which are used to calculate or determine the correction factor may comprise one or more intermediate components which are not present close or adjacent in time to the first time $t_1$ and/or the second time $t_2$.

A component may be considered as being not present close or adjacent in time to the first time $t_1$ and/or the second time $t_2$ when the component is at least two, three, four, five, six, seven, eight, nine or ten time periods remote, removed or distant from the first time $t_1$ and/or the second time $t_2$. A single time period may be selected from the group consisting of: (i) <1 μs; (ii) 1-10 μs; (iii) 10-100 μs; (iv) 100-1000 μs; (v) 1-10 ms; (vi) 10-100 ms; (vii) 100-1000 ms; (viii) 1-10 s; (ix) 10-100 s; (x) 100-1000 s; and (xi) >1000 s.

According to an aspect there is provided a mass spectrometer comprising:

a device arranged and adapted to introduce an external or extrinsic lock mass sample or calibrant at a first time $t_1$; and a control system which is arranged and adapted:

(i) to mass analyse a sample;

(ii) to make a first external calibration measurement at or in relation to the first time $t_1$;

(iii) to recognise one or more intermediate components which are first present or first observed after the first time $t_1$; and (iv) to calculate or determine a correction factor based upon at least some of the one or more intermediate components.

The device may be further arranged and adapted to introduce an external or extrinsic lock mass sample or calibrant at a second time $t_2$ and wherein the control system is further arranged and adapted:

to make a second external calibration measurement at or in relation to the second time $t_2$; and to recognise one or more intermediate components which are first present or first observed after the first time $t_1$ and which are last present or last observed prior to the second later time $t_2$.

According to an aspect there is provided a mass spectrometer comprising:

a device arranged and adapted to introduce an external or extrinsic lock mass sample or calibrant at a first time $t_1$ and at a second time $t_2$; and a control system which is arranged and adapted:

(i) to mass analyse a sample;

(ii) to make a first external calibration measurement at or in relation to the first time $t_1$;

(iii) to make a second external calibration measurement at or in relation to the second time $t_2$;

(iv) to recognise one or more intermediate components which are first present or first observed after the first time $t_1$ and which are last present or last observed prior to the second later time $t_2$; and (v) to calculate or determine a correction factor based upon at least some of the one or more intermediate components.

According to another aspect there is provided a mass spectrometer having a control system which is arranged and adapted:

(i) to mass analyse a sample;

(ii) to recognise one or more intermediate components which are first present or first observed after a first time $t_1$ and which are last present or last observed prior to a second later time $t_2$; and (iii) to calculate or determine a correction factor based upon at least some of the one or more intermediate components.

The mass spectrometer may further comprise a device arranged and adapted to introduce an external or extrinsic lock mass sample or calibrant at the first time $t_1$ and at the second time $t_2$ and wherein the control system is further arranged and adapted:

(i) to make a first (external) calibration measurement at or in relation to the first time $t_1$; and (ii) to make a second (external) calibration measurement at or in relation to the second time $t_2$.

The control system may be further arranged and adapted to generate a first mass spectral data set and to correct the mass, mass to charge ratio or time of at least a portion of the first the mass spectral data set using the calculated or determined correction factor in order to generate a second mass spectral data set.

According to another aspect there is provided a method of mass spectrometry comprising:

mass analysing a sample;

recognising one or more components which are present or observed during a first scan, first time window or first spatial region;

recognising one or more components which are present or observed during a second subsequent scan, second time window or second spatial region, wherein the second subsequent scan, second time window or second spatial region corresponds with, is a repeat of or neighbours the first scan, first time window or first spatial region; and calculating or determining a correction factor based upon at least some of the one or more components.

According to another aspect there is provided a mass spectrometer having a control system which is arranged and adapted:

(i) to mass analyse a sample;

(ii) to recognise one or more components which are present or observed during a first scan, first time window or first spatial region;

(iii) to recognise one or more components which are present or observed during a second subsequent scan, second time window or second spatial region, wherein the second subsequent scan, second time window or second spatial region corresponds with, is a repeat of or neighbours the first scan, first time window or first spatial region; and (iv) to calculate or determine a correction factor based upon at least some of the one or more components.

BRIEF DESCRIPTION OF THE DRAWINGS

Various embodiments will now be described, by way of example only, and with reference to the accompanying drawings in which.

DETAILED DESCRIPTION

Figure 1:
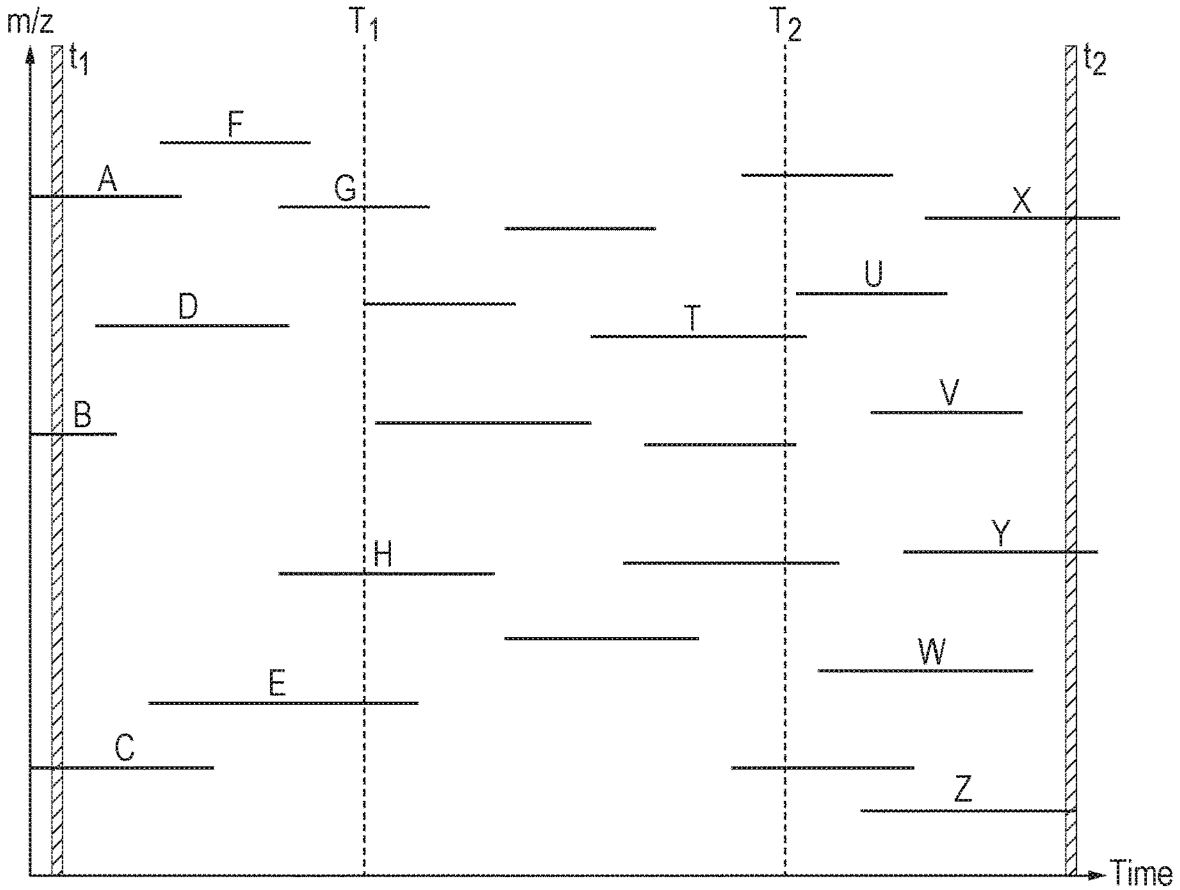
FIG. 1 shows a representation of a time period during which no conventional lock mass correction is available and wherein horizontal bars represent the elution profiles of analyte ion species with sufficiently good characteristics to be used for calibration purposes.

Various embodiments will now be described in more detail. According to various embodiments an intrinsic mass to charge ratio calibration method is provided. The method comprises a fully intrinsic method wherein analyte species which are intrinsically or naturally present in an analyte mass spectra are used for lock mass correction.

The method according to various embodiments differs from other known intrinsic calibration methods in that the method relies upon the detection of analyte ions which may be present for only a portion of an acquisition period rather than background ions which may be present during the whole of an acquisition.

According to various embodiments the intrinsic species may be present either for a large proportion of the experiment or alternatively the intrinsic species may elute from a separation technique such as a liquid chromatography ("LC") column over a relatively short period of time.

According to various embodiments an analytical instrument, mass analyser or mass spectrometer is provided which comprises a chromatography or other separation device arranged upstream of an ion source. The chromatography or other separation device may comprise a liquid chromatography or a gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion source may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The analytical instrument may further comprise: (i) one or more ion guides; (ii) one or more ion mobility separation devices and/or one or more Field Asymmetric Ion Mobility Spectrometer devices; and/or (iii) one or more ion traps or one or more ion trapping regions.

According to an approach the accurate masses of the intrinsic species may be stored in a library of known species and/or background ions.

However, several problems exist with calibration methods using intrinsic species to calibrate mass spectral data. One particular problem is that the ionisation of background ions being used as intrinsic ion species for calibration purposes may be suppressed when analyte species elute. Another problem with the known approach is that the number and type of available background ions may vary during the elution time. This may be due, for example, to applying a liquid chromatography (LC) gradient.

The problems associated with conventional calibration methods using intrinsic components can become especially acute when the mass scale of the instrument changes over a short timescale. Accordingly, it is important to update the lock mass correction reliably and frequently.

Various embodiments relate to a fully intrinsic method which may be used instead of or in support of conventional calibration methods as discussed above. The method according to various embodiments may be applied during one or more time periods during an experiment during which no reliable external known lock mass species are available. For example, no reliable known lock mass species may be available either because of the failure (possibly temporary) of another method or because the frequency of introduction of an external lock mass species has been reduced intentionally to avoid interference with the acquisition of analyte data.

According to various embodiments it is assumed that the mass scale is sufficiently accurate for the application or experiment being performed at the start and/or end of a time period. The accurate mass calibration at the start and/or end of the time period may be due, for example, to a recent instrument calibration or may be due to the use of another lock mass method such as an external lock mass method.

Accordingly, accurate masses or mass to charge ratios may be assigned to many of the ion peaks which are present in the sample or otherwise observed at one or both endpoints of each time period as shown in FIG. 1.

With reference to FIG. 1, the two vertical bars are shown which represent or indicate the start $t_1$ and end $t_2$ of a time period of interest. The time period may, for example, comprise several or tens of minutes. The calibration of the instrument, mass analyser or mass spectrometer is assumed to be adequate at both the start ($t_1$) of the time period of interest and also at the end ($t_2$) of the time period of interest.

The horizontal bars shown in FIG. 1 correspond with the elution profiles of analyte ion species of interest rather than background ions. The analyte ion species represented by horizontal bars in FIG. 1 may have sufficiently good characteristics such that the ion species may be used to propagate or extend the calibration of the instrument, mass analyser or mass spectrometer to intermediate times between the start ($t_1$) of the time period of interest and the end ($t_2$) of the time period of interest.

It will be apparent that at all times (as exemplified by time points $T_1$ and $T_2$ which are shown for illustrative purposes only) at least two or three analyte ion species are eluting and may be used for calibration purposes. In FIG. 1 the ion species are all transient ion species that appear and disappear over the time period of interest. However, it will be appreciated that this is merely for illustrative purposes and there may also be other ion species that may be present across substantially the entire time period of interest which may or may not be utilised.

Thus, for illustrative purposes only, analyte ion species A, B and C are shown in FIG. 1 as eluting with elution times which overlap with the start $t_1$ of the time period. Since analyte ion species A, B and C elute with elution times which overlap with the start $t_1$ of the time period then ion species A, B and C may also be calibrated accurately and hence the time period during which ions may be accurately calibrated may be extended beyond $t_1$ (towards $t_2$). This may be performed as a post-processing step.

In a similar manner, analyte ion species X, Y and Z are shown in FIG. 1 eluting with elution times which overlap with the end $t_2$ of the time period. Since analyte ion species X, Y and Z elute with elution times which overlap with the end $t_2$ of the time period then ion species X, Y and Z may also be calibrated accurately and hence the time period during which ions may be accurately calibrated is extended before $t_2$ (back towards $t_1$).

Further analyte ion species such as F, D and E (and U, V and W) which only begin to elute after the first time $t_1$ and which have finished eluting before the second time $t_2$ may now be considered.

It is apparent from FIG. 1 that analyte ion species F elutes with an elution time which overlaps with analyte ion species A and C. Analyte ion species D elutes with an elution time which overlaps with analyte ion species A, B and C. Analyte ion species E elutes with an elution time which overlaps with analyte ion species A and C.

Accordingly, calibration may be extended to analyte ion species F, D and E based upon already calibrated analyte ion species A, B and C.

Furthermore, analyte ion species G and H elute with an elution time which overlaps with analyte ion species F, D and E. Accordingly, calibration may be further extended to analyte ion species G and H based upon calibrated analyte ion species F, D and E.

At the illustrative time $T_1$ three analyte ion species (G, H and a third unlabeled) are eluting. The elution time of the three analyte ion species overlaps with at least one calibrated analyte ion species F, D and E and demonstrates how the calibration may be further extended.

Essentially, ions which have been calibrated on the basis of an external lock mass at a first time $t_1$ may then be used to calibrate a series of later eluting analyte ions such as analyte ion species F, D and E. The later eluting analyte ions F, D and E may in turn be used to calibrate a series of yet later eluting analyte ions such as G and H.

Accordingly, analyte ions which elute after $t_1$ may be calibrated based upon a series of previously calibrated analyte ions.

Similarly, mass spectral data may be post-processed so that ion species which elute before the second later time $t_2$ may be calibrated and the calibration may be applied working backwards in time towards $t_1$.

With reference to FIG. 1, it will be apparent that the corrections to the mass to charge ratios of analyte ion species G, H and T are determined only indirectly by virtue of the overlap of these ions with earlier calibrated analyte ion species F, D and E or later calibrated analyte ion species U.

Neither analyte ion species F, D, E nor analyte ion species U were present during any calibration period or event $t_1$, $t_2$. However, analyte ion species F, D, E and U can still be accurately measured because these analyte ion species are present or are observed at a time which overlaps in time with directly calibrated analyte ion species A, B and C and directly calibrated analyte ion species X, Y and Z which were present during a calibration event $t_1$, $t_2$.

According to various embodiments, the mass correction for a first spectrum M may be determined by comparing it with a previous spectrum M−1.

When the two scans are compared, N ion peaks may be confidently identified as being common to the two scans.

According to various embodiments ion peaks which are compromised by interference or saturation may be omitted from this list.

Accordingly, a list of N mass measurements may be compiled for scan 1:

$$m_1=(m_{11},m_{12},m_{13} \ldots m_{1N}) \qquad (1)$$

with associated uncertainties:

$$\sigma_1=(\sigma_{11},\sigma_{12},\sigma_{13} \ldots \sigma_{1N}) \qquad (2)$$

Similarly, a list of N mass measurement may be compiled for scan 2:

$$m_2=(m_{21},m_{22},m_{23} \ldots m_{2N}) \qquad (3)$$

with associated uncertainties:

$$\sigma_2=(\sigma_{21},\sigma_{22},\sigma_{23} \ldots \sigma_{2N}) \qquad (4)$$

Gaussian distributions for the mass measurement errors may be assumed. Furthermore, assuming that the mass shift between the two spectra is a simple constant of proportionality namely $m_2 \approx g m_1$ then the maximum likelihood value for g is given by:

$$g = \frac{\sum_{n=1}^{N} \frac{m_{1n} m_{2n}}{\sigma_{1n}^2+\sigma_{2n}^2}}{\sum_{n=1}^{N} \frac{m_{1n}^2}{\sigma_{1n}^2+\sigma_{2n}^2}} \pm \frac{1}{\sqrt{\sum_{n=1}^{N} \frac{m_{1n}^2}{\sigma_{1n}^2+\sigma_{2n}^2}}} \qquad (5)$$

Figure 2:
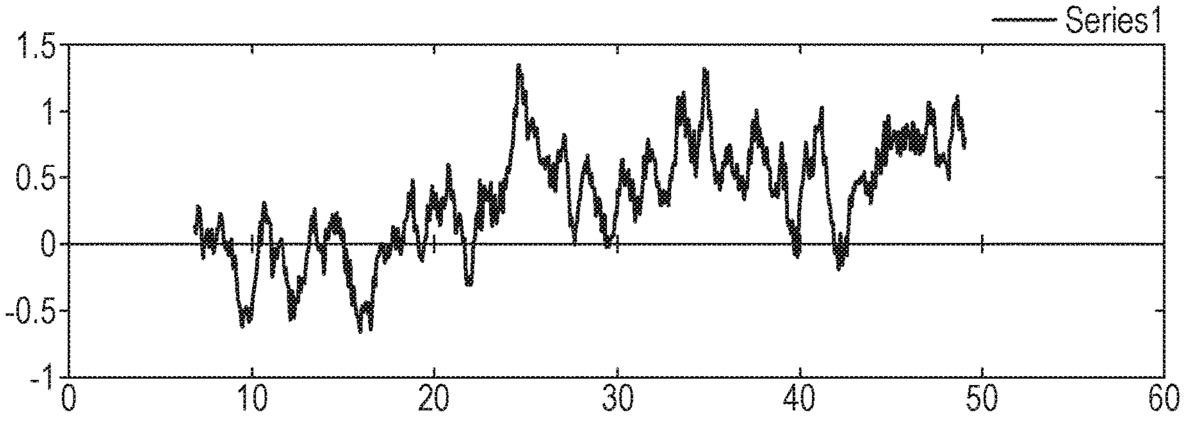
FIG. 2 shows the rolling average of ions having a mass to charge ratio of 255 prior to mass correction and illustrates the problem of accurately calibrating ions between two lock mass calibration events.

FIG. 2 shows the rolling average of ions having a mass to charge ratio of 255 according to uncorrected mass spectral data. In particular, FIG. 2 shows time-averaged mass measurements from a 50 second infusion experiment of an ion peak having a mass to charge ratio (m/z) of 255 and wherein the mass spectral data is uncorrected for calibration shift.

The mass to charge ratio measurements were acquired using an orthogonal acceleration Time of Flight instrument or mass analyser.

Figure 3:
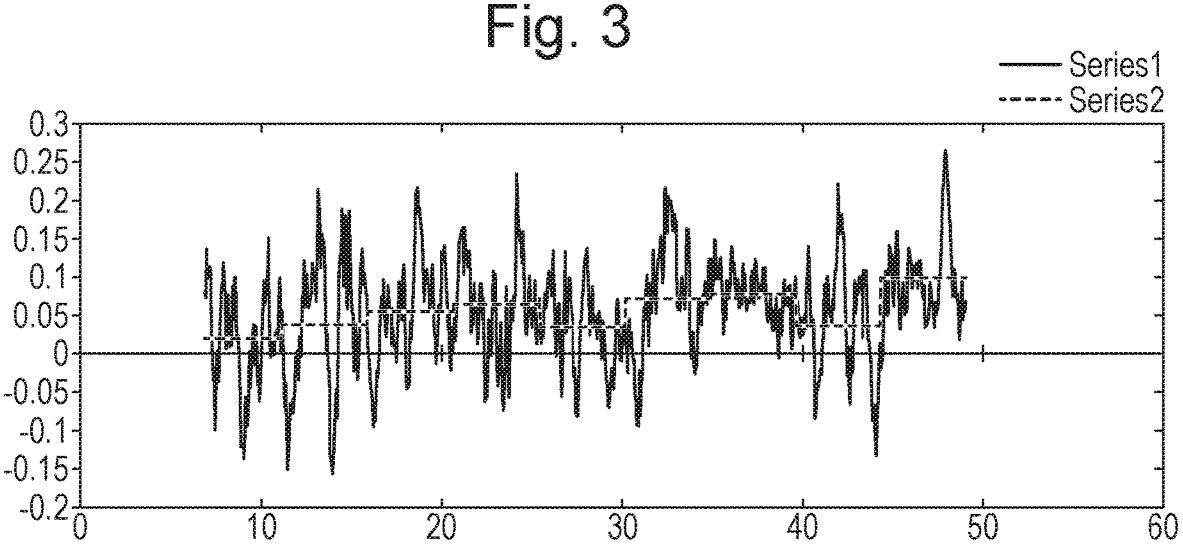
FIG. 3 shows a corrected mass to charge ratio of ions having a mass to charge ratio of 255 according to an embodiment and illustrates that a significant improvement in mass calibration may be achieved according to various embodiments.

To simulate chromatographic replacement of calibration peaks, corrections were calculated using two ion peaks having mass to charge ratios of 785 and 524 in alternating fashion with a period of 5 s. The corrected mass spectral data is shown in FIG. 3 and illustrates both the improvement in mass accuracy which may be obtained according to various embodiments as well as residual statistical behavior.

Random walk behavior can be reduced by utilizing as many peaks in the data as possible, by linking features together across non-contiguous acquisition time periods where possible and by introduction of additional extrinsic calibrants as often as required.

According to various embodiments the required frequency of extrinsic calibration events may be determined using predicted ion statistics and predicted random walk behavior.

Alternatively, the need for an additional calibration event may be determined in real time based on observed ion statistics and predicted random walk behavior.

An algorithm such as Apex3D™ WATERS CORPORATION® may be used to identify features or regions of interest in the data. A feature may comprise one or more isotopes of any species present in the data for more than one acquisition period. Since the mass to charge ratio of a feature should not vary with retention time, it is possible to relate scans that are not necessarily consecutive. This generalizes the binary approach described above.

The general problem may be restated as looking for a function g(n) for n1<=n<=n2 where n is acquisition period or scan index and n1 and n2 are the endpoints of the time region in question (so that g(n1) and g(n2) are known).

With or without the addition of feature detection, imposing smoothness constraints or prior knowledge of the form of g(n) will help to reduce the natural random walk behavior of the approach.

In particular, restrictions may be imposed on the integrated curvature of g(n) or as an expected change per unit time. This is particularly helpful in post-processing correction, where information from the future (at the end of the time period) can be used to help stabilize lock mass corrections at earlier times. Prior knowledge regarding the expected time dependence of the correction factor could be determined based on a pre-characterisation of the instrument, e.g. using measurements performed using known samples in an environmental chamber or naturally variable environment. Various other approaches would of course be possible.

The parameters defining g(n) may be determined using a Markov Chain Monte Carlo method or, specifically, nested sampling or one of many other optimization or statistical inference techniques including Bayesian methods. For instance, using a Bayesian approach, a prior probability distribution for the parameters defining g(n) over time may be determined based on knowledge of the correction factor at any direct calibration times, as well as the expected variation of the correction factor over time (e.g. as determined based on a pre-characterisation of the instrument). Any measurements of intrinsic ion species thus represent new data that can be used to update the probability distribution. An updated posterior probability distribution for the parameters defining g(n) can then be calculated in view of the observed intrinsic ion species, and then used to infer representative values for the parameters defining g(n) at any time point(s) of interest, as well as associated error-bars (uncertainties) for the values. As part of this procedure, the unknown mass to charge ratios of the components to be utilized (for example the detected Apex features) may be explored (marginalized).

The function g expresses the time-dependence of the correction factor (which may be a single parameter or multi-parameter calibration expression such as a polynomial). When the correction factor is a multi-parameter (e.g. linear) correction, prior knowledge relating to the expected time dependence of the correction factor may be given independently for each of the parameters comprising the correction (for example the polynomial coefficients). Alternatively, information may be given in the form of a covariance matrix per unit time with matrix dimensions corresponding to the individual parameters.

Other non-mass spectral information may be used to help to constrain the behavior of the correction factor g(n), for example temperature measurements that may be correlated in a known way with changes in mass-to-charge measurement.

In regions where no suitable overlapping species are present, the current lock mass correction may be propagated forwards (or, when post-processing, backwards) unchanged.

Alternatively, in a post-processing approach, interpolation consistent with the expected time dependence of the correction factor may be used. This interpolation becomes increasingly uncertain at times distant from reliable measurements and this may be reflected in error estimates for the components of the calibration and/or species measured during these periods.

In a post-processing approach, corrections may be propagated backwards in time in a manner consistent with any prior information regarding the time dependence of the correction factor, and this allows correction of components which first appear prior to the first introduction of an extrinsic lock mass sample or calibrant.

The technique is not limited to variations on chromatographic timescales. Other embodiments are contemplated wherein there may be measurable changes in mass scale during an ion mobility (or other separator or mass selective ion trap) experiment or scanning or stepping mass filter (or other filter such as a differential mobility spectrometer ("DMS")) experiment profiled by a sufficiently high-resolution mass spectrometer.

In these cases, an "acquisition period" may of the order of an individual time of flight experiment or acquisition which may be, for example, of the order of 100 μs. As long as components exist in more than one acquisition period it is possible to use that information to constrain the function g(n) during the separation or scan in question.

Additionally, the technique is not limited to utilizing features that are present in a contiguous set of acquisition periods. It is possible, for example, that a persistent feature may be unusable for some period of time. This can happen, for example, as a result of a temporary mass interference which could be identified using a change in peak shape or a sudden change in mass inconsistent with the known behavior of the instrument. The feature may also temporarily disappear or may fall below a statistically useful intensity owing to ion suppression or variation in conditions in the ion source.

Other reasons for repeated appearance and disappearance of a feature include intentionally induced time dependent behavior in the mass spectrometer such as a nested ion mobility separation or scanning mass filter experiment as described above.

Figure 4:
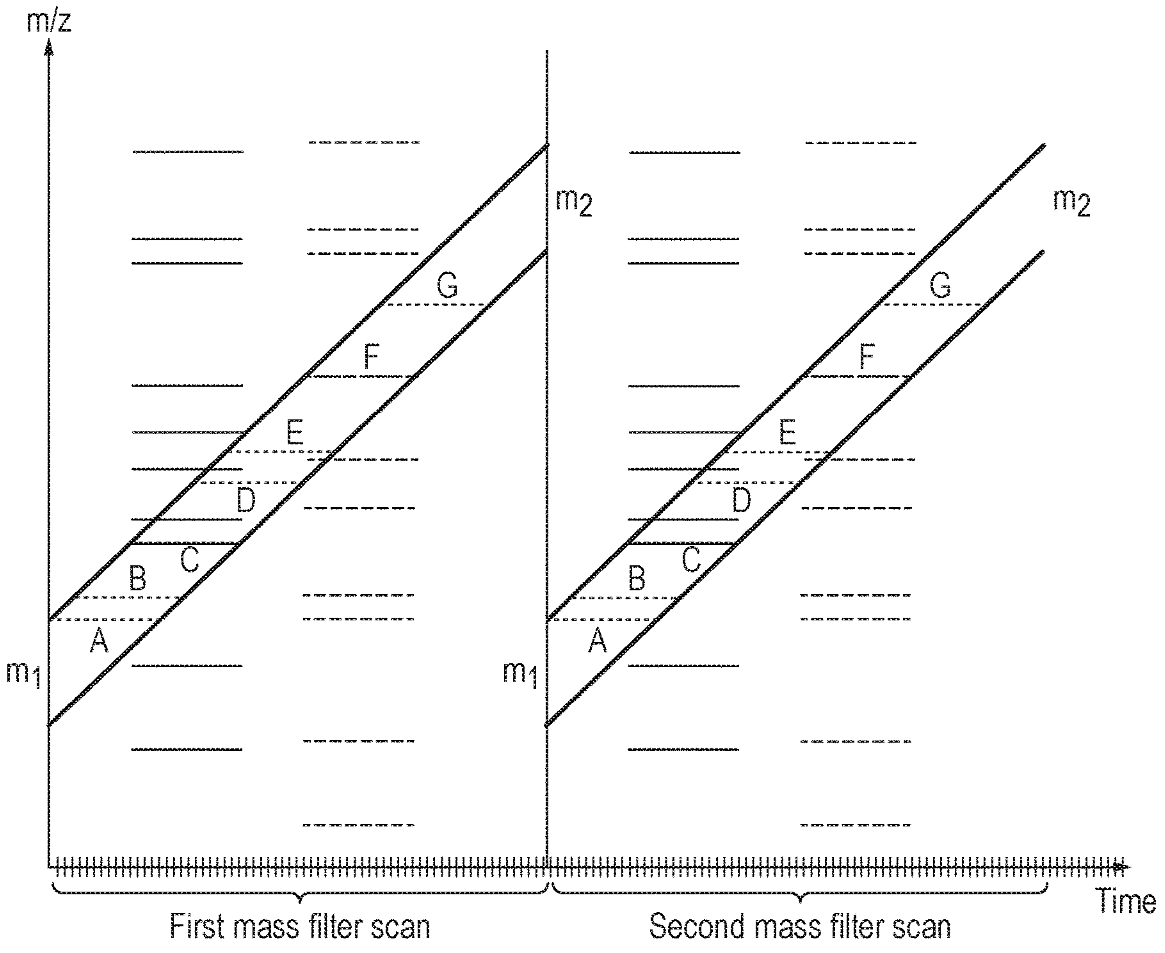
FIG. 4 illustrates a further embodiment and shows a high energy scanning mass filter experiment wherein fragmentation is performed after a first mass filtering step and which illustrates that calibration may be achieved by utilising components which appear in successive experiments or scans such that non-contiguous components may be utilised to provide for mass or mass to charge ratio correction.

FIG. 4 depicts a high energy scanning mass filter experiment wherein fragmentation is performed after a first mass filtering step and illustrates how the approach according to various embodiments may be extended to non-contiguous mass spectral data.

Ions may be fragmented using a collision, fragmentation or reaction device. The collision, fragmentation or reaction device may comprise any suitable collision, fragmentation or reaction device. For example, the collision, fragmentation or reaction device may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

According to various embodiments which will be described in more detail with reference to FIG. 4, a mass filter may be provided which may be scanned repeatedly between masses $m_1$ and $m_2$ in a manner as shown in FIG. 4. Numerous time of flight mass spectra may be recorded during the scan. The demarcation between spectra is represented by the fine ticks on the x-axis, wherein the x-axis represents time.

During each scan, parent or precursor ions which are indicated by horizontal lines or elution profiles A, B, C, D, E, F, G are transmitted for a finite period of time which is determined by the resolution of the mass filter as represented by the sloping or slanted lines and the speed of the scan.

Some parent or precursor ions such as parent or precursor ions C and F are shown as fragmenting to produce a plurality of fragment or daughter ions. The fragment or daughter ions have a range of mass to charge ratios and are present or otherwise observed at the same time as their corresponding parent or precursor ions C and F.

Some parent or precursor ions may be absent from the high energy data owing to complete fragmentation.

The extended calibration approach according to various embodiments which has been described above with reference to FIGS. 1-3 may also be applied to mass spectral data obtained in a manner as described with reference to FIG. 4 as long as a sufficient number of components exist in more than one acquisition time period and there is a sufficient proximity of such components to allow mass accuracy to be retained during the scan.

For example, parent or precursor ions A and B persist for several acquisition time periods and they are both present for several of these time periods.

Similarly, parent or precursor ions B and C and corresponding fragment ions of parent or precursor ion C persist and overlap and so on.

The same approach may be applied to low energy filter scanning experiments wherein mainly parent or precursor ions are present, low and high energy ion mobility mass spectrometry experiments and alternating high and low energy MS experiments ($MS^E$).

In experiments in which there is significant commonality between successive filter scans or separation cycles (such as the two mass filter scans shown in FIG. 4) the existence of components in successive experiments or scans is a particular example of non-contiguous components as described above.

Non-contiguous components may be observed in infusion experiments and in experiments in which the scan or separation time is nested inside a slower experiment such as an LC separation.

The presence of component A at the start of the first and second scans in the embodiment described with reference to FIG. 4 constrains the relationship between g(n) at those times.

Accordingly, if component A is accurately mass measured during the first high energy scan, then even if it were impossible for some reason to maintain mass accuracy during the first scan it might still be possible to recover mass accuracy at the start of the second high energy scan by effectively using component A as an intrinsic lock mass. A similar approach may be adopted for other common components and fragments.

The use of Bayesian methods also allows the approach to be extended to any arbitrary, e.g. non-contiguous, spectral data. For example, because the prior probability distribution for the calibration shifts (i.e. the parameters defining g(n)) is based on the expected variation of the correction factor, which is defined continuously over time, inferences at different time points are correlated. Thus, the expected variation of the correction factor can be used to bridge any gaps where there are no or only relatively few intrinsic ion species to cover a larger time period of interest. An updated posterior probability distribution covering all times can therefore be calculated in view of the available knowledge, including any measured intrinsic ion species. The posterior probability distribution can then be used to infer the calibration shift at any time point(s) of interest.

The applicability of the method according to various embodiments utilises the ability to identify mass spectral features as belonging to a single component in multiple acquisition time periods. This may be simply due to proximity of those acquisition periods in time so that a small mass window can be used to match components with low probability of error. However, there may be other reasons to associate features between acquisition periods. For example, two spectra in an MS imaging experiment may be expected to have significant commonality owing to spatial proximity in the sample being imaged even if a significant time has passed between the acquisition of the spectra. The two spectra may, for example, lie on successive rows of the image.

Association of species may be probabilistic rather than definitive. This process may be aided by constraints on the type of mass change that may occur between the spectra being associated. Particularly, intrinsic ion species that are present across multiple acquisition periods may be identified by tracking mass spectral peaks across different acquisition periods and associating a number of mass spectral peaks from different acquisition periods with a single ion species when the variation in mass to charge ratio (m/z) for the mass spectral peaks from acquisition period to acquisition period is consistent with an expected mass to charge ratio (m/z) variation over time based on an expected variation in calibration shift. The expected variation in calibration shift could be determined based on a pre-characterisation of the instrument, e.g. using measurements performed using known calibrants in an environmental chamber. Various other approaches would of course be possible.

Further, if a large number of species are to be used for mass correction, various known statistical methods such as outlier rejection techniques and Markov Chain Monte Carlo sampling methods may be used to reduce or remove the effect of incorrect associations.

Many different criteria may be used to select appropriate features in the data to use for correction. For example, data that is identified as saturated or interfered with may intentionally be excluded from consideration. As noted above, this selection process may result in components comprising non-contiguous time periods.

The same approach may also be used to correct measurements other than mass such as drift time in an ion mobility experiment.

In real time operation, the mass scale may be corrected by changing a voltage or voltages applied to one or more ion optical elements in order to compensate for the calculated shift in mass. The required changes may be determined using a feedback loop.

Extra terms may be incorporated in the calculation of the correction to prevent any possible instability or wandering in the feedback loop. For example, an optimized Proportional-Integral-Derivative ("PID") type of control loop may be employed. Such optimised feedback loops may be able to compensate for higher frequency variations than the above "proportional term only" example.

Additionally, the feedback parameters may be optimised using a machine learning approach.

Real time calculation and interrogation of the error signal in the loop may be performed on line using Field-Programmable-Gate-Arrays ("FPGAs").

Adjusting ion arrival times as opposed to data has the advantage of maintaining mass resolution when multiple spectra are summed, avoiding the need for resampling of the data to maintain the relationship between peak position and time bin locations.

It will be appreciated that the various embodiments described in detail above are potentially applicable to all Time of Flight instruments or mass analysers. Various embodiments may also be used in conjunction with folded flight path instruments. In particular, the approach according to various embodiments may be implemented on a folded flight path instrument in order to address specific short term mass stability issues with folded flight path instruments.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:

mass analysing a sample;

introducing an external or extrinsic lock mass sample or calibrant at a first time $t_1$, making a first external calibration measurement at or in relation to the first time $t_1$;

recognising one or more intermediate components which are first present or first observed after the first time $t_1$; and calculating or determining a correction factor based upon at least some of the one or more intermediate components.

2. A method as claimed in claim 1, further comprising:

introducing an external or extrinsic lock mass sample or calibrant at a second later time $t_2$; and making a second external calibration measurement at or in relation to the second time $t_2$;

wherein the step of recognising one or more intermediate components comprises recognising one or more intermediate components which are first present or first observed after the first time $t_1$ and which are last present or last observed prior to the second later time $t_2$.

3. A method as claimed in claim 1, wherein the correction factor comprises a mass, mass to charge ratio or time correction factor.

4. A method as claimed in claim 1, further comprising generating a first mass spectral data set and correcting the mass, mass to charge ratio or time of at least a portion of the first the mass spectral data set using the calculated or determined correction factor in order to generate a second mass spectral data set.

5. A method as claimed in claim 1, wherein the one or more intermediate components comprise intrinsic analytes within the sample or intrinsic analyte ions generated from the sample.

6. A method as claimed in claim 1, wherein at least some of the one or more intermediate components which are used to calculate or determine the correction factor comprise first intermediate components which are present or observed during time periods which overlap with the first time $t_1$ and/or which overlap with the second time $t_2$.

7. A method as claimed in claim 6, wherein the first intermediate components are directly calibrated.

8. A method as claimed in claim 6, wherein at least some of the one or more intermediate components which are used to calculate or determine the correction factor comprise second intermediate components are not present or which are not observed during a time period which overlaps with the first time $t_1$ and/or which overlaps with the second time $t_2$.

9. A method as claimed in claim 8, wherein the second intermediate components are indirectly calibrated.

10. A method as claimed in claim 6, wherein at least some of the first intermediate components and at least some of the second intermediate components are present or observed during time periods which contiguously overlap between the first time period $t_1$ and the second time period $t_2$.

11. A method as claimed in claim 1, wherein the one or more intermediate components which are used to calculate or determine the correction factor are present or observed during non-contiguous time periods.

12. A method as claimed in claim 1, further comprising changing one or more voltages applied to one or more ion optical elements in order to compensate for a calculated or determined shift in mass, mass to charge ratio or time.

13. A method as claimed in claim 1, wherein at least some of the one or more intermediate components which are used to calculate or determine the correction factor comprise one or more intermediate components which are not present close or adjacent in time to the first time $t_1$ and/or the second time $t_2$.

14. A method of correcting mass spectral data comprising:

making calibration measurements at one or more calibration times using calibrants which have known mass to charge ratio (m/z) values or previously mass measured mass to charge ratio (m/z) values;

making a list of intrinsic components which are present during more than one acquisition periods, wherein the components have mass to charge ratio (m/z) values that were not present or observed during or close to the one or more calibration times; and utilising the list to calculate a correction factor for one or more acquisition periods which are not close or adjacent in time to an acquisition period containing a directly calibrated mass to charge ratio (m/z) value.

15. A mass spectrometer comprising:

a device arranged and adapted to introduce an external or extrinsic lock mass sample or calibrant at a first time $t_1$; and a control system which is arranged and adapted:

(i) to mass analyse a sample;

(ii) to make a first external calibration measurement at or in relation to the first time $t_1$;

(iii) to recognise one or more intermediate components which are first present or first observed after the first time $t_1$; and (iv) to calculate or determine a correction factor based upon at least some of the one or more intermediate components.

16. A mass spectrometer as claimed in claim 15, wherein the device is further arranged and adapted to introduce an external or extrinsic lock mass sample or calibrant at a second time $t_2$ and wherein the control system is further arranged and adapted:

to make a second external calibration measurement at or in relation to the second time $t_2$; and to recognise one or more intermediate components which are first present or first observed after the first time $t_1$ and which are last present or last observed prior to the second later time $t_2$.

17. A mass spectrometer as claimed in claim 15, wherein the control system is further arranged and adapted to generate a first mass spectral data set and to correct the mass, mass to charge ratio or time of at least a portion of the first the mass spectral data set using the calculated or determined correction factor in order to generate a second mass spectral data set.

* * * * *